United States Patent
Schuermann et al.

(10) Patent No.: US 8,671,310 B2
(45) Date of Patent: Mar. 11, 2014

(54) METHOD AND SYSTEM FOR REDUNDANTLY CONTROLLING A SLAVE DEVICE

(75) Inventors: Martin Schuermann, Blomberg (DE); Gunnar Lessman, Nieheim (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 12/311,538

(22) PCT Filed: Oct. 2, 2007

(86) PCT No.: PCT/EP2007/008545
§ 371 (c)(1),
(2), (4) Date: Oct. 9, 2009

(87) PCT Pub. No.: WO2008/040526
PCT Pub. Date: Apr. 10, 2008

(65) Prior Publication Data
US 2010/0030937 A1    Feb. 4, 2010

(30) Foreign Application Priority Data
Oct. 2, 2006  (DE) .......................... 10 2006 047 026

(51) Int. Cl.
*G06F 11/00*    (2006.01)
(52) U.S. Cl.
USPC .............. 714/11; 714/10; 714/47.1; 709/208; 700/3
(58) Field of Classification Search
USPC ............. 714/10, 11, 47, 47.1; 700/3; 709/208
See application file for complete search history.

(56) References Cited

U.S. PATENT DOCUMENTS

| | | | |
|---|---|---|---|
| 5,583,757 A | 12/1996 | Baca, Jr. et al. | |
| 7,421,478 B1 * | 9/2008 | Muchow | 709/209 |
| 8,266,234 B1 * | 9/2012 | Chapman et al. | 709/208 |
| 2003/0140270 A1 * | 7/2003 | Lehmann | 714/6 |
| 2007/0083861 A1 * | 4/2007 | Becker et al. | 717/174 |

FOREIGN PATENT DOCUMENTS

| | | |
|---|---|---|
| DE | 10030329 | 1/2002 |
| DE | 69914443 T2 | 4/2004 |
| DE | 102004051130 | 5/2006 |
| EP | 1006423 | 6/2000 |
| WO | WO2006/042779 | 4/2006 |

OTHER PUBLICATIONS

International Search Report based on corresponding International application No. PCT/EP2007/008545 dated Feb. 5, 2008.

(Continued)

*Primary Examiner* — Sarai Butler
(74) *Attorney, Agent, or Firm* — Ohlandt, Greeley, Ruggiero & Perle, LLP

(57) ABSTRACT

The disclosure provides a control and data transmission installation for redundantly controlling a slave device, which may be a field transmitter. The effect achieved by the control and data transmission installation is that essentially seamless control of a field transmitter can be assured even when a control device fails. The control and data transmission installation has at least two control devices and at least one slave device which are connected to one another by a communication network. The slave device contains addressable output interfaces for receiving output and status data. Each control device has a device for producing and transmitting status and output data for a separate output interface of the slave device, and the slave device has an evaluation device which controls the forwarding of received output data for further use in response to the status signals received from the control devices.

13 Claims, 1 Drawing Sheet

(56) References Cited

OTHER PUBLICATIONS

International Preliminary Report and Written Opinion dated May 14, 2009 for corresponding International patent application No. PCT/EP2007/008545.

Office Action for corresponding Chinese Patent Application No. 200780036888.2 dated Dec. 1, 2010.

Office Action dated May 23, 2011 in corresponding German Application No. DE 10 2006 047 026B4.

* cited by examiner

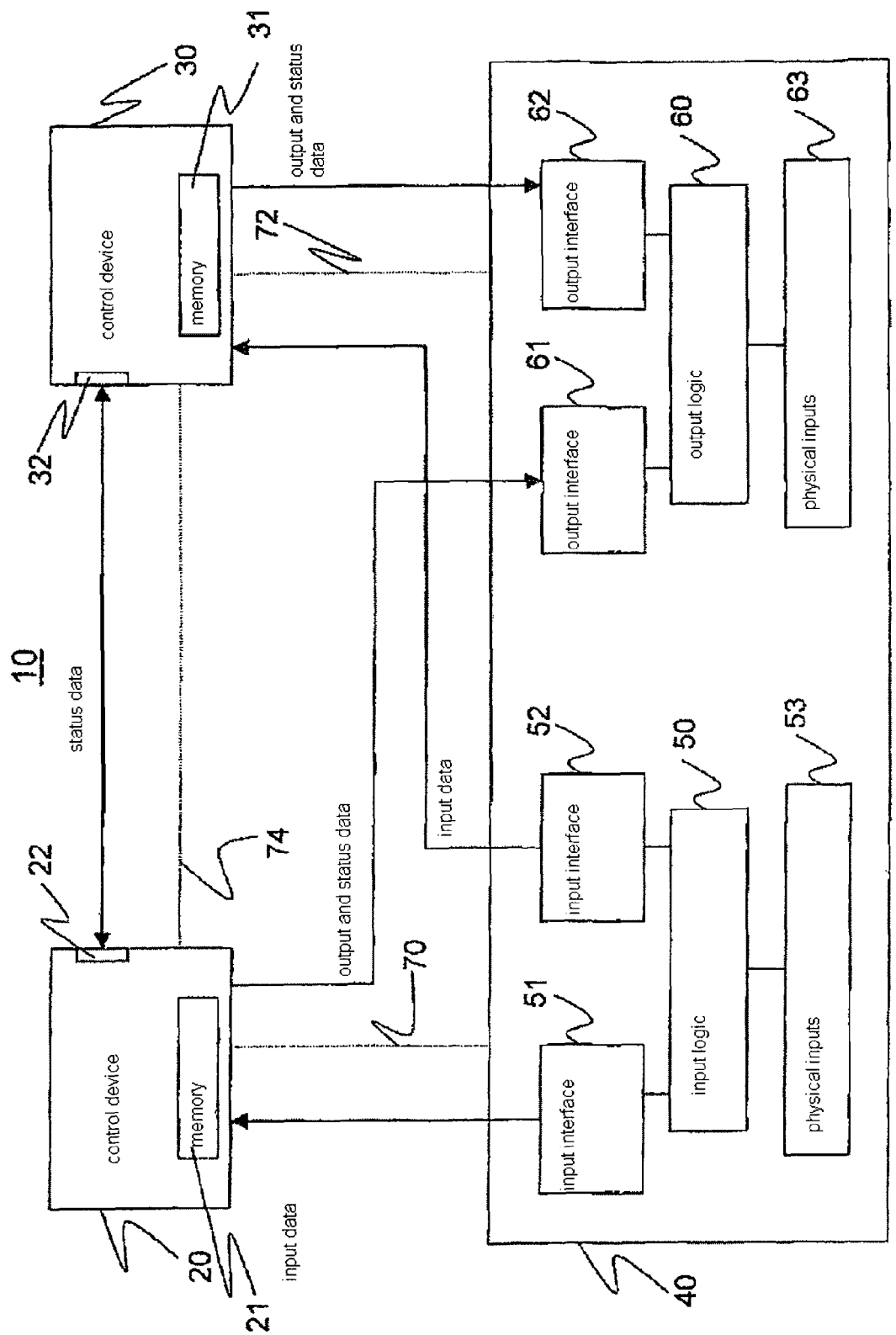

METHOD AND SYSTEM FOR REDUNDANTLY CONTROLLING A SLAVE DEVICE

CROSS REFERENCE TO RELATED APPLICATIONS

This application is a U.S. National Stage Entry under 35 U.S.C. §371 of PCT/EP2007/008545, which was filed on Oct. 2, 2007, which claims the benefit of German Patent Application No. 10-2006-047-026.5, which was filed on Oct. 2, 2006.

The invention relates to both a control and data transmission installation as well as a method for redundantly controlling a slave device by means of at least two control devices, which are intended particularly for application in automation techniques.

In order to increase the availability and reliability of plants and equipment, for example, in automation techniques, electronic components are primarily designed in a redundant manner. If one electronic component should fail, another redundantly provided electronic component will take over the necessary tasks and functions, whereby it is a moot point whether the redundant electronic components operate in parallel or whether only when one electronic component fails will the other electronic component be turned on.

Currently, field bus systems are known, in which two redundant control devices control one field apparatus. As soon as one control device fails, the other control device takes over its tasks by switching from this one control device to the other control device. This so-called redundant change-over occurs, from the standpoint of the field apparatuses being controlled, with a certain change-over time, so that a seamless control cannot be assured when one control device fails.

The object of the invention is to provide a method as well as a control and data transmission installation which assure an essentially seamless control of a field apparatus even when one control device fails.

A core concept of the invention is to be seen in the fact that a slave device, which can be a field apparatus, in particular, is provided with several, preferably two, addressable output interfaces, whereby each output interface can be controlled by a separate control device. An evaluation device of the slave device serves for the purpose of establishing at any time which control device should supply output data for the slave device.

The above-named technical problem is solved, on the one hand, by the present application.

Accordingly, a control and data transmission installation is provided for the redundant control of a slave device. It should be noted here that the control and data transmission installation involves an automation installation and the slave device is a field apparatus.

The slave device is connected via a communications network with at least two control devices. The slave device has several, preferably two, addressable output interfaces for receiving output and status data. Output data may involve control data, such as, for example, parameterizing and configuration data and similar information. In contrast, status data signal the operating state of a control device. Each control device has a device for generating and transmitting status and output data to a separate output interface of the slave device. In addition, the slave device has an evaluation device, which, in response to the status signals received from the control devices, controls the forwarding of output data that have been received for further use.

It should be mentioned here that output interface designates a device which receives the data coming from a control device. Output interfaces preferably involve logic interfaces, so that the actual connection to the communications network can only be made via a physical interface, e.g., an Ethernet interface. Alternatively, the output interfaces, however, may also involve physical interfaces.

With the formulation that the forwarding of output data received for further use will be controlled, for example, the forwarding of output data will be sent to physical outputs to which are connected, for example, controllers, memories and/or a processor of the slave device, into which the output data are introduced. Further, an embodiment can be obtained by this formulation, in which the output data are introduced into an application running in the slave device.

Advantageous enhancements are also provided by the present application.

In order to assure that the output data of all control devices do not need be considered by the slave device when all control devices are operating properly, the evaluation device is designed in such a way that, upon response to status signals which signal the proper operation of all control devices, it passes on only the output data of a specified control device.

Since all control devices that are provided for controlling the slave device transmit status and output data to the slave device, when one of the control devices fails, a seamless and correct continued operation of the slave device will be assured due to the fact that the evaluation device is designed in such a way that, upon response to status signals which signal the failure of a control device, only the output data coming from a properly working control device will be considered by the slave device.

In order to avoid the circumstance that if all control devices fail, the slave device would change over into an uncontrollable operation, the evaluation device, upon response to status signals which signal the failure of all control devices, will control the slave device to [assume] a definable operating state. For example, in such circumstance, the power supply to the slave device will be interrupted.

Therefore, since the control programs of the control devices essentially run synchronously relative to the slave device being controlled, the slave device has at least one addressable input interface for providing input data for the control device. Input interface is understood to mean a device which provides the input data for the control device, from the standpoint of this control device. For this purpose, each control device has a device for receiving the input data provided by the respective input interface.

If the slave device contains several input interfaces, then individual addresses are assigned to these, by means of which the control devices can access the input data. In other words, the input interfaces serve for the purpose of assigning the input data specific for the control devices to several input interfaces, so that the input data can be transmitted preferably synchronously from the input interfaces under control of an input logic to the respective control devices. In this way, it can be assured that the slave device is controlled essentially synchronously by the control devices. It should be noted here that the input interfaces are preferably logic interfaces, so that the slave device can only be connected to the communications network via a physical interface. Alternatively, the input interfaces can be designed as physical interfaces.

In addition, each control device may have a device for the targeted accessing of a specified input interface of the slave device.

Therefore, since the control devices can monitor one another, these control devices are designed for exchanging status data. Further, each control device has a device for detecting the failure of the other control device by evaluating the status data received.

Therefore, since each control device can require input data specific for it and can transmit status and output data specific for the slave device, both the addresses of the input interfaces as well as the addresses of the output interfaces of the slave device are stored in one memory.

Preferably, the control devices and the slave device are connected via a TCP/IP-based network, for example, the Ethernet or a field bus.

In a particularly advantageous manner, two control devices control the slave device.

The above-named technical problem is also solved by the present application.

Accordingly, a method is provided for redundantly controlling a slave device by means of at least two control devices, which are connected with the slave device via a communications network. Each control device transmits status and output data to a separate output interface of the slave device. It should be mentioned here that status and output data need not be transmitted together in one packet or frame to the slave device. Rather, it is conceivable that the status data are transmitted first, and then output data are transmitted to the slave device in a separate communication cycle. The status data received are then evaluated and, upon response to the evaluated status signals, only the output data coming from a specified control device will be forwarded for further use, i.e., will be considered by the slave device.

The status data represent the operating state of the respective control device, whereby, if the status data signal the failure of a control device, the output data of the other control device are forwarded and whereby, if the status signals signal the proper operation of all control devices, only the output data of a specified control device will be forwarded.

According to an advantageous embodiment, the control devices call upon the slave device to transmit input data to the control devices. In the simplest case, each control device is connected via a cable connection to the slave device, by means of which the input data will be transmitted to the control devices.

The slave device preferably has a control logic which assures that input data are provided at the same time in the control devices. In this way, it is assured that the control devices can control the slave device synchronously.

In an alternative embodiment, the control devices can exchange status data with one another, whereby each control device can transmit status data, which signal its own operating state and the operating state of the other control device, to the respective output interface of the slave device. In this way, the failure of a control device can also be communicated to the slave device for the case when the connection between the defective control device and the slave device has been broken, and thus status data also can no longer be transmitted by this control device to the slave device.

The invention will be explained in more detail in the following on the basis of an example of embodiment.

The single FIGURE shows an exemplary control and data transmission installation 10, which is used, for example, in automation techniques. The control and data transmission installation 10 is constructed redundantly. In the present example, this means that a slave device 40, also denoted a field apparatus in the following, communicates with two control devices 20 and 30, preferably synchronously. Control devices 20 and 30 are connected to field apparatus 40 via a communications network. The communications network, which is shown symbolically by the dotted connection paths 70, 72 and 74, can be a TCP/IP communications network, such as, for example, the Ethernet or a field bus.

It should be noted here that, of course, more than two control devices also can exchange data with field apparatus 40. Control and data transmission installation 10 usually also contains more than only one field apparatus.

In order to be able to assure a smooth, that is, seamless communication between control devices 20 and 30 and field apparatus 40, field apparatus 40 has two input interfaces 51 and 52, which can transmit data to control device 20 or 30, respectively. The input interfaces 51 and 52 serve for the purpose of introducing the input data, which are applied to physical inputs 53, to control device 20 or of control device 30, preferably synchronously. An input logic 50, which is disposed between physical inputs 53 and input interfaces 51 and 52, provides that the input data are made available at the same time to control devices 20 and 30. It is assured in this way that both control devices 20 and 30 can operate the same control programs or applications, so that a parallel, i.e., redundant monitoring and control of field apparatus 40 occurs by means of control devices 20 and 30. Further, it is assured thereby that the control of field apparatus 40 can change over smoothly, that is, seamlessly, from one control device to the other control device. The input interfaces 51 and 52 in the present example are designed as logic interfaces, which can communicate with control devices 20 or 30 via a single physical interface, which is not shown, for example, an Ethernet interface.

It should be noted here that logic input interfaces 51 and 52 as well as the input logic are not absolutely necessary. It is sufficient if the input data lying at the physical inputs are transmitted simultaneously to control devices 20 and 30, or if the two control devices can simultaneously read the input data. For example, the input data can be filed in a memory device (not shown), which the two control devices 20 and 30 can access sequentially or simultaneously. Such a memory may be implemented in input interfaces 51 and 52, as long as these are physical interfaces.

In the present example, an address is assigned to each logic input interface. For example, the address of input interface 51 is filed in a memory 21 of control device 20, while the address of input interface 52 is filed in a memory 31 of control device 30. The input data of field apparatus 40 can be called up by a known polling procedure, which is performed by control devices 20 and 30. Alternatively, the input interfaces 51 and 52, for example, can be triggered by input logic 50 in such a way that at any desired time point or cyclically, the input data are sent from input interface 51 and input interface 52 in a targeted manner to control device 20 or to control device 30.

In addition, two logic output interfaces 61 and 62, each of which is assigned an address, are implemented in field apparatus 40. The logic output interfaces 61 and 62 in this case communicate with control devices 20 or 30 via a physical interface, which is not-shown. For example, the address of output interface 61 is filed as the target address in memory 21 of control device 20, while the address of output interface 62 is filed as the target address in memory 31 of control device 30. In this way, output and status data can be transmitted in a targeted manner from control device 20 to output interface 61 and output and status data can be transmitted from control device 30 to output interface 62. An output logic 60, which is also called an evaluation device in the following, is connected to both output interfaces 61 and 62 and provides that the output data received at the output interfaces are forwarded in a specified manner to physical outputs 63 of field apparatus 40. It should be noted that the output interfaces 61 and 62 also can be designed alternatively as physical interfaces by means of which slave device 40 is connected to the communications network.

Control devices 20 and 30 may also exchange status data with one another in order to synchronize the running of control programs and/or to communicate the respective operating state to the other control device.

The mode of operation of the control and data transmission installation shown in the FIGURE will be explained in more detail in the following.

It should first be mentioned that the term input interface is used in order to imply that the data sent from field apparatus 40 to control devices 20 and 30 represent input data for the control devices. The term output interface was used in order to imply that the output and/or status data arriving in the output interfaces of field apparatus 40 are output data of the control devices.

It will now be assumed that input data for control devices 20 and 30 are made available at the physical inputs 53 of field apparatus 40. The input data may involve status data referring to apparatuses, temperature data of a temperature sensor that is connected to one of the physical inputs 53, or similar information. The input data applied to physical inputs 53 are transmitted, under control of input logic 50, from input interfaces 51 and 52, to control device 20 or to control device 30, and this transmission is preferably carried out at the same time. The input data received are then introduced into corresponding control programs and/or application programs, which are running in the control devices, so that control devices 20 and 30 can synchronously control field apparatus 40. Alternatively, the input data also can be called up by control devices 20 and 30 from field apparatus 40. For this purpose, each control device transmits a request packet, which contains the respective target address of the respective input interface. For example, control device 20 transmits an input data request packet to input interface 51, whereby the input data request packet contains both the address of control device 20 as well as the target address of input interface 51. In a similar manner, control device 30 can transmit an input data request packet, which contains both the address of control device 30 as well as the target address of input interface 52, to input interface 52 of field apparatus 40. For example, the input logic 50 can read out the input data request commands contained in the packets and control input interfaces 51 and 52 in such a way that the input data are transmitted to control device 20 via input interface 51 and to control device 30 via input interface 52.

It shall be further assumed that, according to one example of embodiment, control devices 20 and 30 regularly or at any desired time points transmit data packets that contain status data to field apparatus 40. In the present example, control device 20 transmits packets containing status data to output interface 61 and control device 30 transmits packets containing status data to output interface 62. For this purpose, control device 20 writes the target address of output interface 61 in the packet to be transmitted, while control device 30 writes the target address of output interface 62 in the packet to be transmitted. The status data contained in the packets signal to field apparatus 40 whether the control devices are operating error-free or are defective. The data packets are evaluated in output logic 60, for example. If output logic 60 establishes that the status data transmitted in the packets from control devices 20 and 30 signal an error-free operation of both control devices, then output logic 60 provides that, for example, only the output data transmitted from control device 20 to output interface 61 are forwarded to physical outputs 63 of field apparatus 40 for further processing. Physical outputs 63 form interfaces, for example, to a microprocessor, to a controller or to other controlling units.

In contrast, if output logic 60 of field apparatus 40 establishes that the status data contained in a data packet from control device 30 signal an erroneous operation of control device 30, then output logic 60 provides that only the output data contained in the data packets of control device 20 are still forwarded to physical outputs 63. In this way it is possible to further operate the physical outputs of field apparatus 40 smoothly, that is, in a seamless manner, even when one of the control devices fails.

For the case when the status signals transmitted by both control devices 20 and 30 signal an erroneous operation, output logic 60 can bring field apparatus 40 to a defined operating state. For example, output logic 60 can provide that the power supply to field apparatus 40 will be interrupted, or the physical outputs will be placed at a defined value.

It should be noted that both control devices 20 and 30 usually work off the same control programs. This need not be done synchronously, however.

As has already been mentioned, both control devices 20 and 30 can be designed in such a way that one control device can note the failure of the other control device. For this purpose, control device 20 can have a detection device 22 for detecting the failure of control device 30 and control device 30 can have a detection device 32 for detecting the failure of control device 20. In this case, it is possible that the control device that is operating error-free, for example, control device 20, transmits status data to output interface 61 that signal to output logic 60 that control device 30 is operating erroneously. In this case, output logic 60 in turn provides that only the output data coming from control device 20 to output interface 61 are forwarded to physical outputs 63.

What is claimed is:

1. A control and data transmission installation for redundantly controlling a slave device, comprising:
    at least two control devices; and
    at least one slave device which is connected with the at least two control devices via a communications network,
    wherein the at least one slave device has several addressable output interfaces for receiving output and status data, wherein each control device of the at least two control devices has a device for generating and transmitting status and output data to a separate output interface of the at least one slave device, and wherein the at least one slave device has an evaluation device, which, in response to the status data received from the at least two control devices, controls the forwarding of the output data that have been received for further use,
    wherein the evaluation device, upon receipt of the status data that signals a failure of one of the at least two control devices, forwards the output data coming from a properly operating control device,
    wherein the at least two control devices exchange the status data with one another, and
    wherein each control device of the at least two control devices transmits the status data to the output interface of the at least one slave device, the status data comprising an operating state of each control device.

2. The control and data transmission installation according to claim 1, wherein the evaluation device, upon receipt of status signals that signal the proper operation of all of the at least two control devices, forwards only the output data of a specified control device.

3. The control and data transmission installation according to claim 1, wherein the evaluation device, upon receipt of status signals that signal the failure of all of the at least two control devices, controls the at least one slave device to a definable operating state.

4. The control and data transmission installation according to claim 1, wherein each control device has a device for detecting the failure of another of the at least two control devices and/or a device for calling up a specified input interface of the slave device.

5. The control and data transmission installation according to claim 1, wherein each control device has a memory, in which the addresses of the at least one input interface and of the output interfaces are filed.

6. The control and data transmission installation according to claim 1, wherein the communications network is a TCP/IP-based network or a field bus and the at least one slave device is a field apparatus.

7. The control and data transmission installation according to claim 1, wherein the at least two control devices control the at least one slave device.

8. The control and data transmission installation according to claim 1, wherein the at least one input interface and/or output interfaces are formed as logic interfaces.

9. The control and data transmission installation according to claim 1, wherein the at least one slave device has at least one addressable input interface for providing input data for the at least two control devices, and wherein the at least two control devices each have a device for receiving input data provided by the input interface.

10. The control and data transmission installation according to claim 9, wherein the at least one slave device has several individually addressable input interfaces, each of which provides input data to one of the at least two control devices.

11. A method for redundantly controlling a slave device by means of at least two control devices, which are connected with the slave device via a communications network, comprising:

controlling each control device of the at least two control devices to transmit status and output data to a separate output interface of the slave device;

evaluating the received status data; and upon response to the evaluation of the received status data, forwarding only the output data coming from a specified control device for further use, wherein the received status data represents an operating state of a respective control device of the at least two control devices, and that, if the received status data signals a failure of one control device of the at least two control devices, the output data of a different control device of the at least two control devices are forwarded, and that, if the received status data signals a proper operation of all of the at least two control devices, only the output data of a specified control device will be forwarded, and controlling the at least two control devices to exchange the status data with one another and controlling each control device to transmit the status data to the output interface of the slave device, wherein the status data comprises an operating state of each control device.

12. The method according to claim 11, further comprising controlling the at least two control devices to request the slave device to transmit input data to the at least two control devices.

13. The method according to claim 12, further comprising simultaneously transmitting the input data to the at least two control devices.

* * * * *